July 10, 1928.

M. BARTHOLDY 1,676,721

GAUGE WITH A PRECISION INDICATOR FOR TESTING
THE FLANK DIAMETER OF EXTERNAL THREADS

Filed June 8, 1926

Inventor
Max Bartholdy

Patented July 10, 1928.

1,676,721

UNITED STATES PATENT OFFICE.

MAX BARTHOLDY, OF ESSEN, GERMANY, ASSIGNOR TO FRIED. KRUPP AKTIENGE-SELLSCHAFT, OF ESSEN-ON-THE-RUHR, GERMANY.

GAUGE WITH A PRECISION INDICATOR FOR TESTING THE FLANK DIAMETER OF EXTERNAL THREADS.

Application filed June 8, 1926, Serial No. 114,543, and in Germany December 16, 1925.

This invention relates to a gauge with a precision indicator for testing the flank diameter of external threads, and it has for its object to provide a gauge of this type which distinguishes itself by a particularly simple construction and by the fact that it may be easily handled and used in cutting thread on the lathe.

Figure 1:
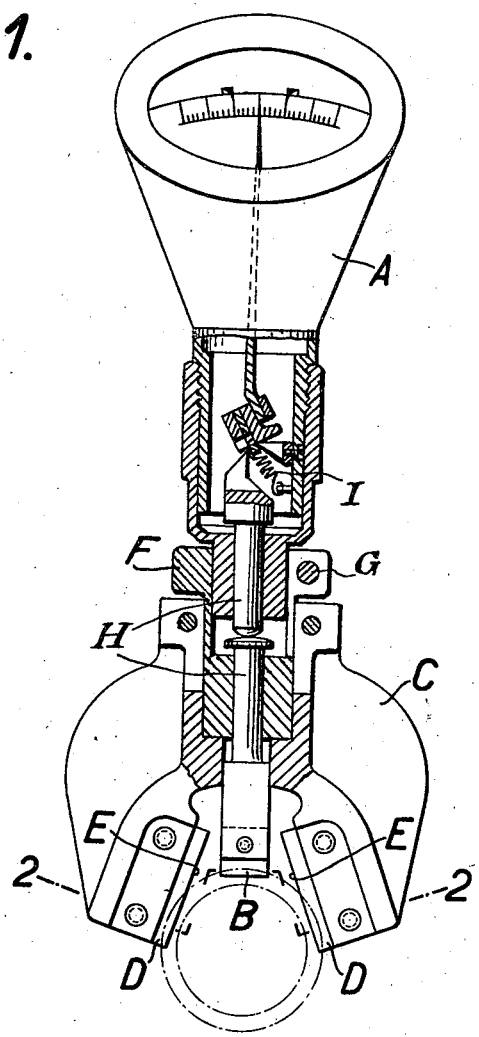

An embodiment of the subject-matter of the invention is illustrated in the accompanying drawing in which:

Fig. 1 is a view of the gauge and

Figure 2:
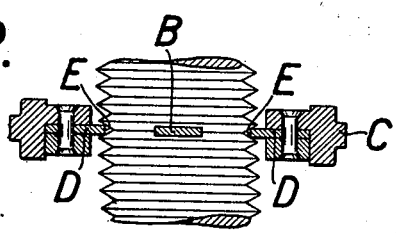

Fig. 2 a section of the gauge in connection with a portion of a threaded body, seen from above along the line 2—2 of Fig. 1.

A gauge with a precision indicator A the feeling bolt H of which carries at its free end a feeling plate B of rectangular cross-section, is clamped in a holder C by means of a collar F adapted to be tightened by a screw bolt G. This holder possesses an angular recess and is provided at each side with a measuring plate D which is likewise of a rectangular cross-section. The feeling plate B and the measuring plates D are adapted to engage a thread at its flank diameter, that is, the diameter midway between the outer diameter of the screw and the diameter at the bottom of the threads. The outer edge faces E of the measuring plates D which serve as supporting surfaces extend at an angle with relation to each other which may be easily determined by calculation and which allows the precision indicator to indicate deviations in the actual size. The pointer of the precision indicator is urged to the left and the feeling bolt H is thereby urged downwardly by a spring I.

For the purpose of testing a thread, the described gauge is first adjusted, in a manner known per se, by the aid of an element of comparison (thread gauge bolt), placing it on this element of comparison in the manner of a rider gauge, see more particularly Fig. 2. If the gauge is thereupon engaged in a corresponding manner with a thread of the body to be tested, it will indicate any deviation of the flank diameter of the member tested from that of the element of comparison.

Claims:

1. A gauge for testing the flank diameter of external threads, comprising a precision indicator having a feeling bolt, a holder in which said precision indicator is clamped, and a pair of angularly related jaws on said holder, said feeling bolt projecting through the apex of the angle formed by said jaws, the jaws and feeling bolt having measuring plates adapted to engage a thread at the flank diameter thereof.

2. In a gauge for testing the size of circular objects, a pair of angularly related jaws, a precision indicator comprising a feeling bolt, a pointer operated by said feeling bolt, resilient means urging said pointer and feeling bolt in one direction, and a scale cooperating with said pointer, and means for securing said precision indicator to said jaws with said feeling bolt extending between said jaws from the apex of the angle formed by them, said resilient means urging said feeling bolt outwardly from the apex of said jaws.

The foregoing specification signed at Cologne, Germany, this 12th day of May, 1926.

MAX BARTHOLDY.